United States Patent
Gilbey et al.

(10) Patent No.: US 10,733,600 B2
(45) Date of Patent: Aug. 4, 2020

(54) METHOD OF EFFECTING AN ELECTRONIC TRANSACTION

(71) Applicant: MasterCard Asia/Pacific Pte. Ltd., Singapore (SG)

(72) Inventors: Benjamin Charles Gilbey, Singapore (SG); Vijin Venugopalan, Singapore (SG); Joseph Hayes, Crandall, GA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 976 days.

(21) Appl. No.: 15/198,900

(22) Filed: Jun. 30, 2016

(65) Prior Publication Data
US 2017/0004494 A1 Jan. 5, 2017

(30) Foreign Application Priority Data
Jul. 1, 2015 (SG) .............................. 10201505235P

(51) Int. Cl.
*G06Q 20/38* (2012.01)
*G06Q 20/34* (2012.01)
(Continued)

(52) U.S. Cl.
CPC ....... *G06Q 20/3821* (2013.01); *G06Q 20/027* (2013.01); *G06Q 20/20* (2013.01)

(58) Field of Classification Search
CPC ... G06Q 20/3821; G06Q 20/20; G06Q 20/348
See application file for complete search history.

(56) References Cited

U.S. PATENT DOCUMENTS

| | | | |
|---|---|---|---|
| 2010/0140346 A1* | 6/2010 | Loeb | G06Q 20/04 235/379 |
| 2014/0143145 A1* | 5/2014 | Kortina | G06Q 20/401 705/44 |

(Continued)

*Primary Examiner* — Suezu Ellis
(74) *Attorney, Agent, or Firm* — Buckley, Maschoff & Talwalkar LLC

(57) ABSTRACT

A method of effecting an electronic transaction is described. The method includes receiving, through a merchant aggregator platform, a selection of one or more articles from a plurality of articles offered for purchase by a plurality of merchants on the merchant aggregator platform, wherein the platform is hosted by a merchant acquirer. Payment vehicle credentials of a payment vehicle are then passed to a payment gateway, and a vehicle representative (VR) is created at the payment gateway and associated with one or more credentials of the payment vehicle, the VR being usable by the merchant aggregator platform, in place of the one or more credentials, but from which the one or more credentials are indeterminable. The VR is then provided to the merchant aggregator platform through which a purchase request is received to confirm that the one or more articles have been purchased. Purchase details of the purchase request are then sent with the VR to the payment gateway at which the payment vehicle credentials are associated with the purchase details, based on the VR, and passed with the payment vehicle credentials to the merchant acquirer for on-going processing of the transaction.

16 Claims, 7 Drawing Sheets

(51) Int. Cl.
*G06Q 20/02* (2012.01)
*G06Q 20/20* (2012.01)

(56) References Cited

U.S. PATENT DOCUMENTS

| | | | | |
|---|---|---|---|---|
| 2014/0365363 A1* | 12/2014 | Knudsen | ............ | G06Q 20/3674 |
| | | | | 705/41 |
| 2015/0052064 A1* | 2/2015 | Karpenko | .......... | G06Q 20/3829 |
| | | | | 705/71 |
| 2015/0073999 A1* | 3/2015 | Hosp | .................... | G06Q 20/204 |
| | | | | 705/76 |
| 2015/0254658 A1* | 9/2015 | Bondesen | ............ | G06Q 20/227 |
| | | | | 705/44 |
| 2019/0318403 A1* | 10/2019 | Schulz | ............... | G06Q 30/0619 |

* cited by examiner

Figure 2: transaction model

Figure 4: settlement model

METHOD OF EFFECTING AN ELECTRONIC TRANSACTION

CROSS-REFERENCE TO RELATED APPLICATION

This application is a U.S. National Stage filing under 35 U.S.C. § 119, based on and claiming benefit of and priority to SG Patent Application No. 10201505235P filed Jul. 1, 2015.

FIELD OF INVENTION

The present invention relates to electronic transactions and, in particular, electronic transactions performed on an electronic platform through which articles from multiple merchants can be purchased.

BACKGROUND

Over the last few decades electronic and physical transactions have increasingly involved the use of physical credit cards and the details of physical credit cards. More recently, transactions have moved towards the use of a digital or virtual wallet.

A digital wallet is typically an app on a smartphone in which a user retains information about their payment vehicle such as credit cards and bank accounts. The electronic wallet is activated when making a transaction and an appropriate payment vehicle is selected from the wallet to provide funds for the transaction.

Payment vehicle credentials, such as credit card number and expiry date, are sent from the electronic wallet to a merchant and from the merchant to a payment gateway through which the transaction is effected. The payment gateway sends the payment vehicle credentials to the electronic platform for association with the transaction. Once the owner of the digital wallet approves the transaction, check-out credentials (including the amount of the transaction, the payment vehicle credentials and so forth) are sent back to the payment gateway, from there to a merchant acquirer (i.e. a bank) and onward for further processing and subsequent settlement.

Despite security measures being in place for regulating online transactions and the platforms on which they can be made, the significant number of merchants and even larger number of transactions means that data is sometimes intercepted. Since that data includes payment vehicle credentials, funds can be stolen or misappropriated during online transactions.

There are also problems faced by some merchants. Where the electronic platform is a smartphone, a merchant often requires an app in order to enable transactions. The development of an app, its servicing and maintenance can be costly and is an unjustifiable expense for some merchants. Moreover, the merchant must then afford the setup and management of online credit and debit card transactions. Moreover, the merchant must then setup a merchant account with a bank or card association in order to support electronic, card-based transactions by consumers.

In addition, when settling an electronic transaction the merchant acquirer receives funds, transfer those funds to the payment gateway and the payment gateway delivers the funds (minus a fee) to the merchant. This multi-handling of settlement funds necessarily takes time to pass through the systems of the merchant acquirer and payment gateway, and deprives the merchant of access to those funds for longer than may be necessary.

It would be useful, therefore, to provide a method of effecting an electronic transaction with improved security for payment vehicle credentials, that enables all merchants to take advantage of app-based purchases, or that reduces the amount of handling of settlement funds before they are delivered to the merchant.

SUMMARY

In an aspect, the present invention provides a method of effecting an electronic transaction, comprising:
  receiving, through a merchant aggregator platform, a selection of one or more articles from a plurality of articles offered for purchase by a plurality of merchants on the merchant aggregator platform, wherein the platform is hosted by a merchant acquirer;
  passing payment vehicle credentials of a payment vehicle to a payment gateway;
  creating a vehicle representative (VR) at the payment gateway and associating the VR with one or more credentials of the payment vehicle, the VR being usable by the merchant aggregator platform, in place of the one or more credentials, but from which the one or more credentials are indeterminable;
  providing the VR to the merchant aggregator platform;
  receiving, through the merchant aggregator platform, a purchase request confirming that the one or more articles have been purchased;
  sending purchase details of the purchase request with the VR to the payment gateway; and
  identifying the payment vehicle credentials and associating them with the purchase details, at the payment gateway, based on the VR and passing the payment vehicle credentials and purchase details to the merchant acquirer for on-going processing of the transaction.

In another aspect, the present invention provides a computer system for effecting an electronic transaction, the computer system comprising:
  a memory device for storing data;
  a display; and
  at least one processor coupled to the memory device and being configured to:
    receive, through a merchant aggregator platform, a selection of one or more articles from a plurality of articles offered for purchase by a plurality of merchants on the merchant aggregator platform, wherein the platform is hosted by a merchant acquirer;
    pass payment vehicle credentials of a payment vehicle to a payment gateway;
    create a vehicle representative (VR) at the payment gateway and associate the VR with one or more credentials of the payment vehicle, the VR being usable by the merchant aggregator platform, in place of the one or more credentials, but from which the one or more credentials are indeterminable;
    provide the VR to the merchant aggregator platform;
    receive, through the merchant aggregator platform, a purchase request confirming that the one or more articles have been purchased;
    send purchase details of the purchase request with the VR to the payment gateway; and
    identify the payment vehicle credentials and associating them with the purchase details, at the payment gateway, based on the VR and passing the payment vehicle credentials and purchase details to the merchant acquirer for on-going processing of the transaction.

In a further aspect, the present invention provides a computer program embodied on non-transitory computer readable media for effecting an electronic transaction, the program comprising at least one code segment executable by a computer to instruct the computer to:

receive, through a merchant aggregator platform, a selection of one or more articles from a plurality of articles offered for purchase by a plurality of merchants on the merchant aggregator platform, wherein the platform is hosted by a merchant acquirer;

pass payment vehicle credentials of a payment vehicle to a payment gateway;

create a vehicle representative (VR) at the payment gateway and associate the VR with one or more credentials of the payment vehicle, the VR being usable by the merchant aggregator platform, in place of the one or more credentials, but from which the one or more credentials are indeterminable;

provide the VR to the merchant aggregator platform;

receive, through the merchant aggregator platform, a purchase request confirming that the one or more articles have been purchased;

send purchase details of the purchase request with the VR to the payment gateway; and identify the payment vehicle credentials and associating them with the purchase details, at the payment gateway, based on the VR and passing the payment vehicle credentials and purchase details to the merchant acquirer for on-going processing of the transaction.

In yet another aspect, the present invention provides a network-based system for effecting an electronic transaction, the system comprising:

a computer system;

at least one database;

a display; and a server system coupled to the client computer system and the database, the server system configured to:

receive, through a merchant aggregator platform, a selection of one or more articles from a plurality of articles offered for purchase by a plurality of merchants on the merchant aggregator platform, wherein the platform is hosted by a merchant acquirer;

pass payment vehicle credentials of a payment vehicle to a payment gateway;

create a vehicle representative (VR) at the payment gateway and associate the VR with one or more credentials of the payment vehicle, the VR being usable by the merchant aggregator platform, in place of the one or more credentials, but from which the one or more credentials are indeterminable;

provide the VR to the merchant aggregator platform;

receive, through the merchant aggregator platform, a purchase request confirming that the one or more articles have been purchased;

send purchase details of the purchase request with the VR to the payment gateway; and identify the payment vehicle credentials and associating them with the purchase details, at the payment gateway, based on the VR and passing the payment vehicle credentials and purchase details to the merchant acquirer for on-going processing of the transaction.

In another aspect, the present invention provides a method for effecting settlement of a purchase, the method comprising:

providing a merchant aggregator platform hosted by a merchant acquirer;

sending purchase details of a purchase made by a consumer of one or more articles offered for sale by a merchant through the platform, from the platform to the merchant acquirer;

forwarding the purchase details from the merchant acquirer to a payment scheme or issuer for debiting settlement funds from an account of the consumer; and forwarding, independently of the purchase details being sent to the issuer, settlement funds to the merchant to settle the purchase.

Unless context dictates otherwise, the following terms will be given the meaning provided here:

"article" relates to anything that can be purchased through the platform, including one of many goods and services.

"indeterminable", as it applies to the vehicle representative (VR) and the one or more payment vehicle credentials, means that the one or more payment vehicle credentials cannot be determined from the vehicle representative. In other words, the VR is not an encryption or cipher. As such, the one or more payment vehicle credentials cannot be determined if the VR is intercepted by a third party, yet the VR can be used by merchants to affect online transactions.

"vehicle representative" or "VR" applies to a string or data structure that can be associated with a transaction, by a merchant, in place of (e.g. as a proxy to) credit card or payment vehicle credentials. Thus, the merchant never need be made aware of the actual payment vehicle credentials of the payment vehicle from which funds are drawn, in order to afford the transaction.

"payment vehicle" includes a credit card, debit card, virtual card, bank account or any other means from which funds can be debited to affect a transaction.

"payment vehicle credentials" are any credentials necessary to affect a transaction. Those credentials may include a credit card number, account number, card or account balance, expiry date and so forth.

"merchant aggregator platform" refers to an app or website on which multiple merchants can offer goods or services for sale, and through which consumers can purchase the goods or services of a merchant, along with a backend for operating the platform and interfacing or communicating with other systems.

BRIEF DESCRIPTION OF THE DRAWINGS

Some embodiments will now be described, by way of non-limiting example only, with reference to the accompanying drawings in which.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
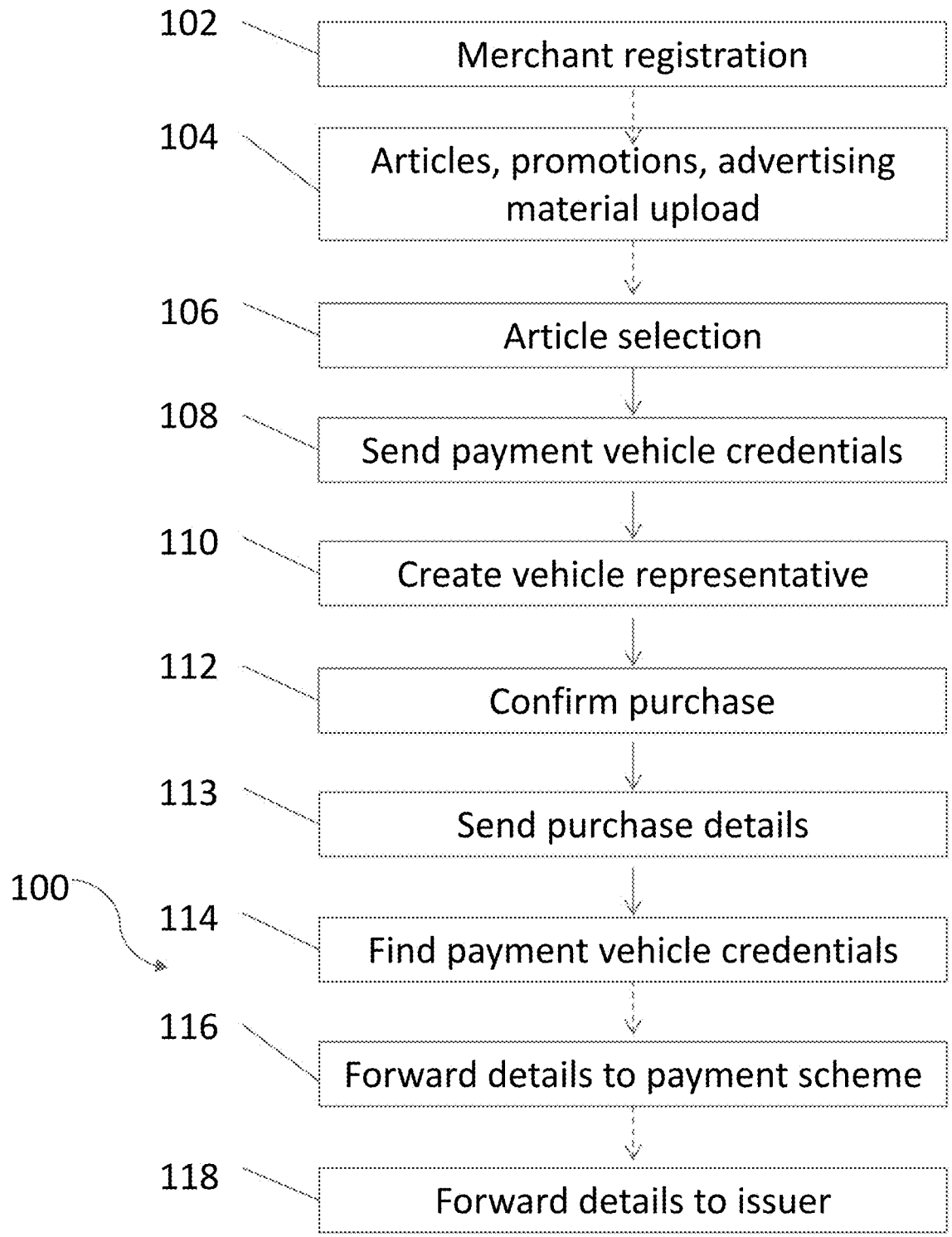
FIG. 1 illustrates a method for effecting an electronic transaction according to an embodiment.

FIG. 1 shows a method 100 for effecting an electronic transaction. The transaction relates to the purchase of an article, or multiple articles, on a merchant aggregator platform such as a mobile app. While there are additional, potentially optional, steps shown in FIG. 1, the method 100 broadly involves:

receiving, through a merchant aggregator platform, a selection of one or more articles for purchase (step 106);
passing payment vehicle credentials to a payment gateway (step 108);
creating a vehicle representative (VR) (step 110);
providing the VR to the merchant aggregator platform (step 112);
receiving, through the merchant aggregator platform, a purchase request
confirming that the one or more articles have been purchased (step 114)
sending purchase and the VR to the payment gateway (116); and
identifying the payment vehicle credentials associated with the VR (118).

Figure 2:
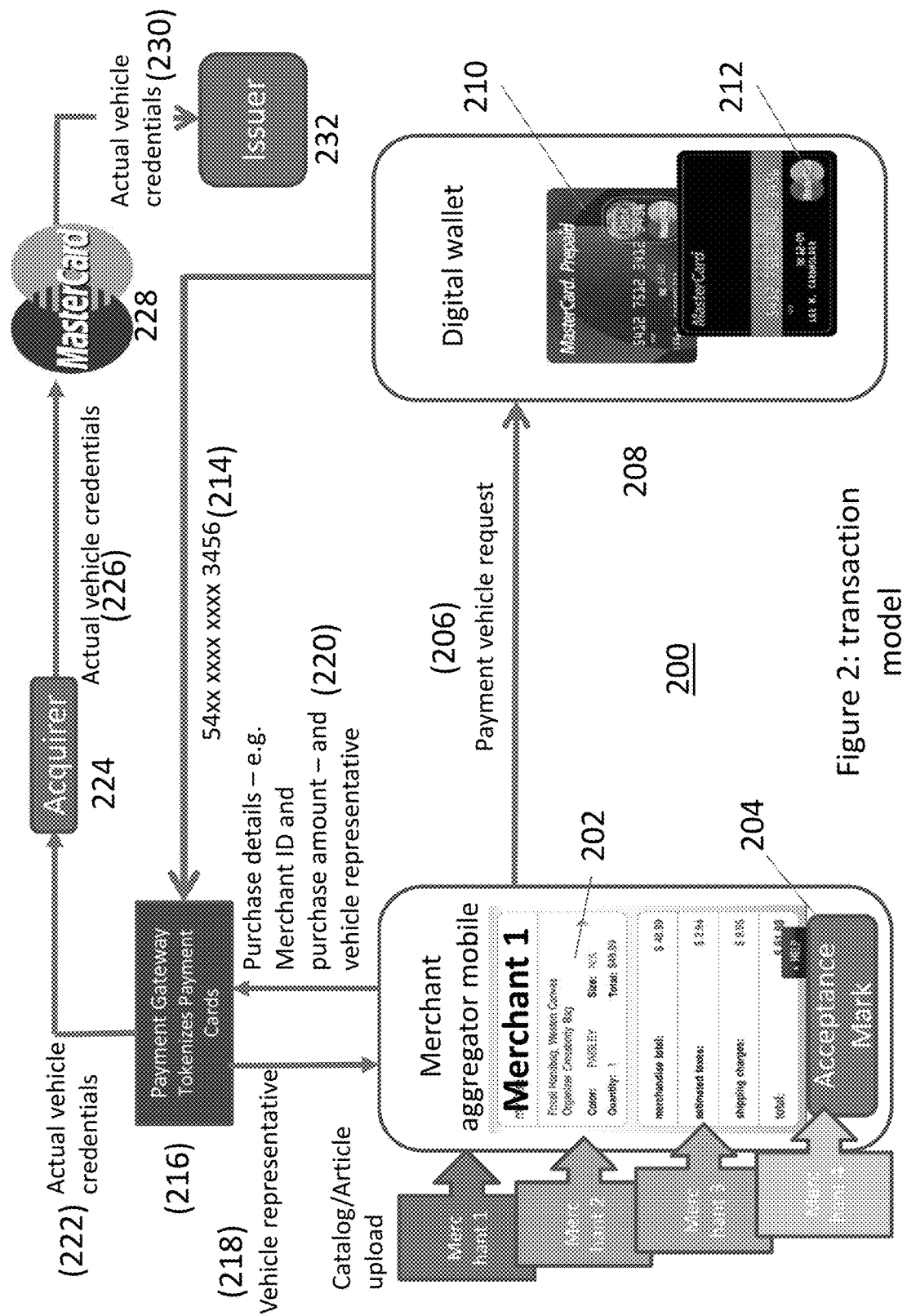
FIG. 2 illustrates a transaction model of a system for effecting an electronic transaction.

With reference to FIGS. 1 and 2, before a transaction takes place some articles must be offered for purchase by one or more merchants. To that end, merchants register with the merchant aggregator platform (step 102). Registration involves establishing an access account, including account login and password, and access credentials by which settlement can be effected. There are two ways of achieving registration of an access account, as discussed below.

The more traditional manner in which registration takes place is for a merchant or their representative to request registration and supply identification details by which the merchant can be identified, authenticated and contacted (e.g. for sending orders). An account is then established by the owner of the merchant aggregator platform, by which the merchant can access particular functionality of the platform. The merchant will then log onto the platform and enter their bank account details by which settlement can be effected.

In contrast, in accordance with present teachings, the merchant aggregator platform is hosted (i.e. owned) by a merchant acquirer. This makes an alternative way of registering merchants available.

The merchant acquirer is usually a bank. In the present embodiment, a plurality of merchants use acquirer bank accounts held by the merchant acquirer. In order to establish acquirer bank accounts the merchant acquirer needs to authorise the merchant to perform transactions into, and from, an acquirer bank account. The merchant acquirer will collect details of the merchant sufficient to establish an acquirer bank account, and thus the merchant acquirer already possesses details about the merchant sufficient to register an access account with the merchant aggregator platform.

In some cases, the merchant acquirer may automatically register an account with the merchant aggregator platform for a merchant upon allocation of an acquirer bank account to that merchant. This process bypasses the registration process which reduces time and complexity for the merchant. This process also reduces the number of organisations and platforms on which private details of the merchant need to be stored (i.e. they do not need to be stored by the merchant aggregator platform), thereby enhancing security of those details.

Once a merchant is registered with the merchant aggregator platform, they are able to upload details about the articles they have for sale, such as descriptions of products or services, product catalogues, promotion details, advertising material and so forth (step 104).

A consumer may then use the merchant aggregator platform to purchase articles. In use, a consumer accesses the merchant aggregator platform and selects one or more articles for purchase (step 106). Articles may be selected from a menu, catalogue, list or any other form of display. The consumer's selection is thus received through merchant aggregator platform.

To purchase the articles the consumer must provide the merchant aggregator platform with a suitable payment vehicle—e.g. credit card, debit card or bank account—from which funds can be debited to effect purchase. This is achieved using a payment gateway that acts as an interface between the merchant, or merchant aggregator platform, and merchant acquirers. The consumer sends payment vehicle credentials—such as card number, balance, expiry and CCV—of the payment vehicle to the payment gateway (step 108) and the payment gateway communicates with the merchant aggregator platform to capture the purchase details. The payment vehicle credentials may also include a unique device or consumer identifier. For example, the payment vehicle credentials may include the International Mobile Station Equipment Identity (IMEI) of a smartphone on which the mobile app 202 is installed. While the IMEI is not traditionally considered a credential of the payment vehicle, it can be identifiable as a location for storage of payment vehicles (where particular types of digital wallet are used) and otherwise enables authentication of the device on which the purchase is being performed and thus increases confidence that the consumer is the true holder of the payment vehicle.

To send the payment vehicle credentials to the payment gateway, the consumer may enter data manually. However, in the present embodiment, the consumer selects a payment Acceptance Mark which opens a digital wallet. The consumer selects a payment vehicle from their digital wallet and the payment vehicle credentials for that payment vehicle are forwarded to the payment gateway.

The payment gateway then creates a vehicle representative (VR) (step 110). The VR acts as a proxy for one or more payment vehicle credentials necessary to perform a transaction. For example, where the payment vehicle is a MasterCard® credit card, the vehicle credentials may be the card number, expiry date, CCV and available balance. The VR is created and associated with the vehicle credentials, and is then sent to the merchant aggregator platform to enable the purchase to take place.

In the present example, the credit card credentials do not have to be sent from the payment gateway to the merchant aggregator platform. This improves security of the credit card details.

Since it can be useful for a consumer to confirm whether they have selected the correct payment vehicle, the PV may comprise, for example, the last 4-digits of the credit card number for display in the merchant aggregator platform. Thus the consumer will be able to confirm which payment vehicle has been selected, but a third party intercepting the VR or purchase details will not be able to ascertain the remaining 12-digits of the MasterCard® credit card number.

When the merchant aggregator platform receives the VR the purchase can take place. Thus the next step (step 112) is the receipt, through the merchant aggregator platform, of a purchase request confirming that one or more articles have been purchased by the consumer. From a consumer perspective, this purchase request is initiated by selecting (e.g. clicking on or touching) a "Confirm", "Buy" or "Submit" button on the merchant aggregator platform. From a system perspective, the selection event in which the "Confirm", "Buy" or "Submit" is selected constitutes a purchase request confirmation.

Once the purchase request confirmation is received, purchase details are sent with the VR to the payment gateway (step 113). The purchase details will typically include the date and time of purchase, the amount of the purchase, the articles purchased, a merchant identifier by which the merchant can be identified, and so forth. It will be appreciated that one or more purchase details may be sent, provided that the purchase details are sufficient for the correct amount of funds to be delivered to the correct merchant at settlement.

Once the payment gateway receives the VR and purchase details, it identifies which payment vehicle credentials are associated with the VR and, correspondingly, with the purchase details (step 114). Thus the payment gateway and merchant aggregator platform have enabled a purchase to take place without both parties needing to know the payment vehicle credentials.

It is important for the VR to accompany the purchase details since the merchant aggregator platform does not know the payment vehicle credentials of the payment vehicle from which funds for the purchase will be debited. As such, the merchant aggregator platform may have no other identifier by which the gateway can determine the payment vehicle credentials, and thus the payment vehicle, from which funds should be debited to afford the purchase.

Once the payment gateway has identified the payment vehicle credentials associated with the purchase, the payment vehicle credentials and relevant purchase details (which may be all of the purchase details supplied to the payment gateway, or a subset of those details) are passed to the merchant acquirer for on-going processing. Where the payment vehicle is a credit or debit card, the merchant acquirer then sends those details on to a payment scheme (e.g. the MasterCard® network—step 116) that forwards the details to the issuer of the card (step 118).

As indicated by broken lines in FIG. 1, the payment scheme and issuer may not be involved in the purchase (and subsequent settlement) in some embodiments of the invention, or the payment scheme and issuer may be the same party as the acquirer. These variations are intended to fall within the scope of the present disclosure.

With further reference to system 200 shown in FIG. 2, the merchant aggregator platform comprises a mobile app 202. Within the mobile app 202 the articles (e.g. products and services) of multiple merchants can be concurrently accessed by a consumer. In some embodiments, the consumer can select articles from multiple merchants for purchase in a single transaction.

The mobile app 202 displays information to the consumer sufficient for the consumer to understand the nature of the articles they intend to purchase and the purchase amount for those articles. When seeking to confirm purchase, the mobile app 202 will have received the VR (per step 108) and can display to the consumer the last 4-digits of the consumer's credit card, for example, to enable verification by the user of the payment vehicle with which the purchase will be made.

The mobile app 202 displays a payment Acceptance Mark 204. Selecting (e.g. clicking on or touching) the payment Acceptance Mark sends a wallet or card request 206 that opens a digital wallet 208 from which the user can select an appropriate payment vehicle 210, 212 with which to make the transaction. Presently, payment vehicle 210 is a MasterCard® debit card and payment vehicle 212 is a MasterCard® credit card.

It will be appreciated that other mechanisms for initiating selection or input of payment vehicle details may be used.

Once a payment vehicle has been selected from the digital wallet, payment vehicle credentials are sent (214) to the payment gateway 216. The payment gateway 216 thus receives all the actual details necessary to afford a purchase or other transaction.

The payment gateway 216 serves as a repository for the payment vehicle credentials while purchase actions are being carried out on the mobile app 204. To prevent payment vehicle credentials from being transmitted to the mobile app 204, the payment gateway 216 creates a VR (see step 110). The VR acts as a proxy for the payment vehicle credentials, but cannot be used to deduce or discover the payment vehicle credentials.

Once created, the VR is sent (218) to the mobile app 204 for association, by the mobile app, with the purchase. Once the purchase has been confirmed, the mobile app 204 returns the VR to the payment gateway along with the purchase details (220). The purchase can therefore be effected without the payment vehicle credentials ever having been passed to the mobile app or the merchant or merchants from whom the one or more articles are being purchased.

The payment gateway 216 then maps the VR to the payment vehicle credentials and thus the purchase details to the payment vehicle credentials. The payment gateway 216 then forwards relevant ones of the payment vehicle credentials and purchase details (222) to the acquirer 224. What is meant by "relevant ones", in relation to the payment vehicle credentials and purchase details, is that sufficient detail is passed to the acquirer for the acquirer to process the transaction. Such "sufficient detail" may be less than the amount of detail, and thus the number of payment credentials and purchase details, necessary to verify the authenticity of the consumer for the purpose of determining whether the purchase is fraudulent, or to make the purchase, yet is sufficient to process the transaction.

The acquirer 224 then forwards those details (226) to the payment scheme 228. The payment scheme 28 subsequently forwards the details (230) to the issuer 232.

Figure 3:
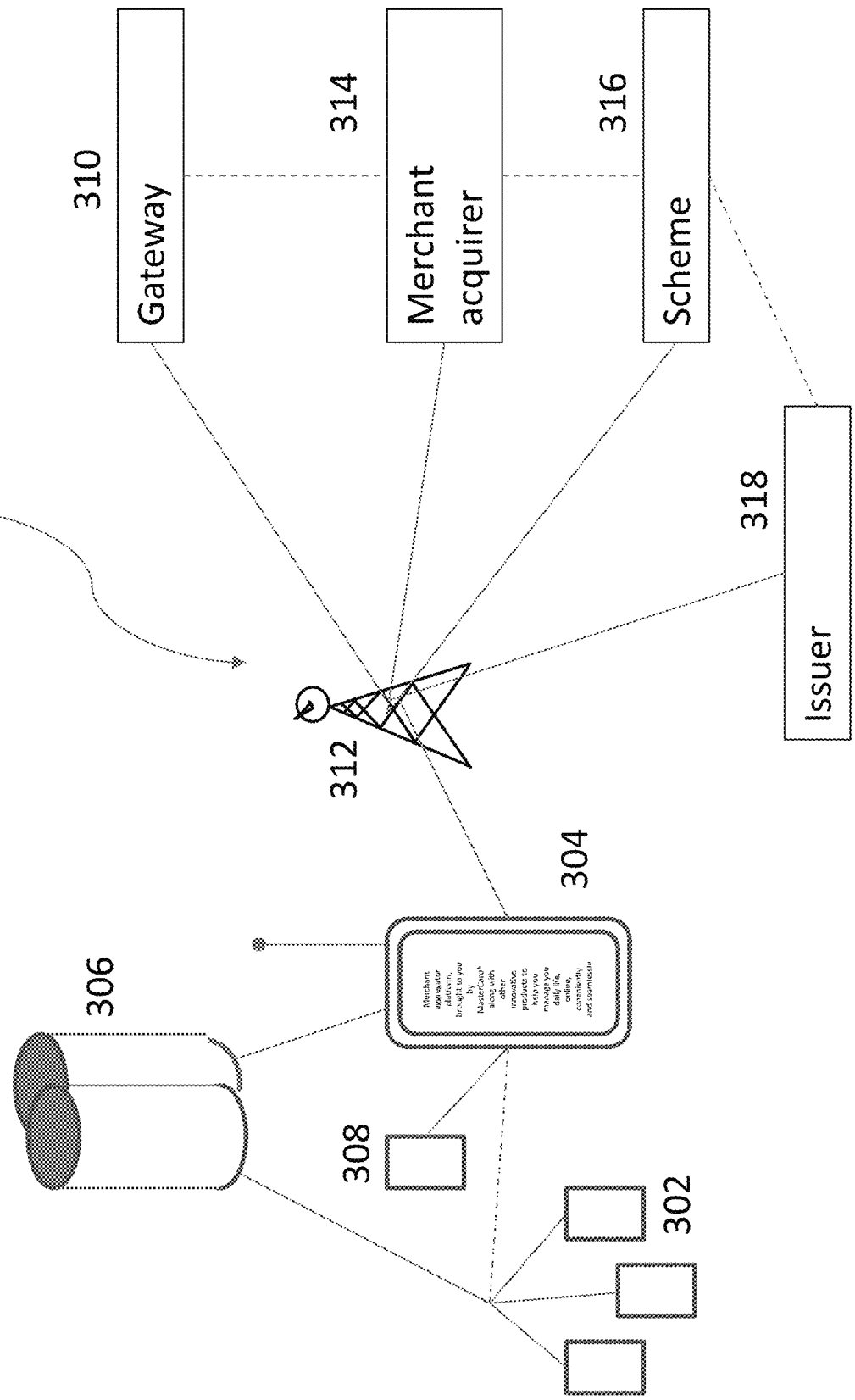
FIG. 3 is a schematic overview of a network for performing the method of FIG. 1.

FIG. 3 shows a network 300 for achieving the method of FIG. 1. The network includes a plurality of merchants 302, a device, presently embodied by a smartphone 304 on which a merchant aggregator platform, in the form of a mobile app, is installed, a memory device such as database 306, a consumer 308, a payment gateway 310 and a communications system 312. These parties interact to manage the purchase of articles by the consumer from the merchants.

To manage on-going processing of the funds for the purchase transaction, the gateway 310 sends purchase details to the merchant acquirer 314 that forwards the purchase details to a payment scheme 316 and those details are subsequently send to a card issuer 318. In some embodiments, the purchase details will only comprise a transaction identifier (e.g. a receipt number) that is passed to the payment gateway with the VR. The merchant aggregator platform can send the same transaction identifier, and other details as would appear on an invoice or receipt, to the merchant acquirer. The payment gateway then need only send the payment vehicle credentials and transaction identifier to the merchant acquirer in order for the merchant acquirer to have sufficient detail to associate the payment vehicle credentials with the purchase details and manage ongoing processing of the transaction. In other words, there is no reason for the payment gateway to receive details of the purchase. Instead, the payment gateway serves as a mechanism for hiding payment vehicle credentials to enable the merchant aggregator platform to operate without the payment vehicle credentials.

In addition, in current practice, merchants each perform their own transaction clearing process which then passes clearance details on to the merchant acquirer to perform its clearing process. Where clearing is not done within certain timeframes, issuers are not obliged to honour the transactions. In the present embodiment, since the merchant acquirer may host the digital wallet, and thus have the payment credentials, and also host the merchant aggregator platform, the merchant acquirer has sufficient detail to perform clearance without the merchant needing to do so. In other words, the merchant need not perform clearance for transactions taking place through the merchant aggregator platform.

This has a follow on benefit with regard to transaction disputed by consumers (e.g. where the consumer asserts they did not make the transaction). In particular, since the merchant is not involved in the clearance process, the disputes are then handled between the merchant acquirer, scheme and issuer without any merchant involvement.

The merchants 302 communicate via their respective access accounts with the merchant aggregator platform, presently mobile app loaded onto smartphone 304. Information such as articles for purchase, catalogues, promotional material, advertising material and the like can be uploaded by the merchants 302 to the mobile app 304 which, indirectly, results in that information being stored in database 306.

A consumer 308 then accesses that information through their smartphone 304 in order to select articles for purchase. When it becomes appropriate to select a payment vehicle as described in relation to FIGS. 1 and 2, the consumer selects a payment Acceptance Mark on their smartphone 304 which enables selection of a payment vehicle the credentials of which are sent to the payment gateway 310.

Communication between the merchants 302, smartphone 304 and payment gateway 310 can be achieved using any appropriate means. Presently that communication is achieved over a wireless network, using network communication tower 312. Other potential networks for communication include near-field communication networks and hardwired connections between the parties (particularly where the merchant aggregator platform is on a webpage).

After the purchase has been made and the details forwarded to the issuer 318, the issuer 318 debits the consumer's account associated with the payment vehicle. The issuer 318 subsequently settles the purchase transaction by sending debited funds back to the payment scheme 316, then onward to the merchant acquirer 314, and via the payment gateway 310 back to the merchant 302 from whom the articles were purchased (or distributed to multiple merchants where the purchase relates to articles acquired from multiple merchants).

Figure 4:
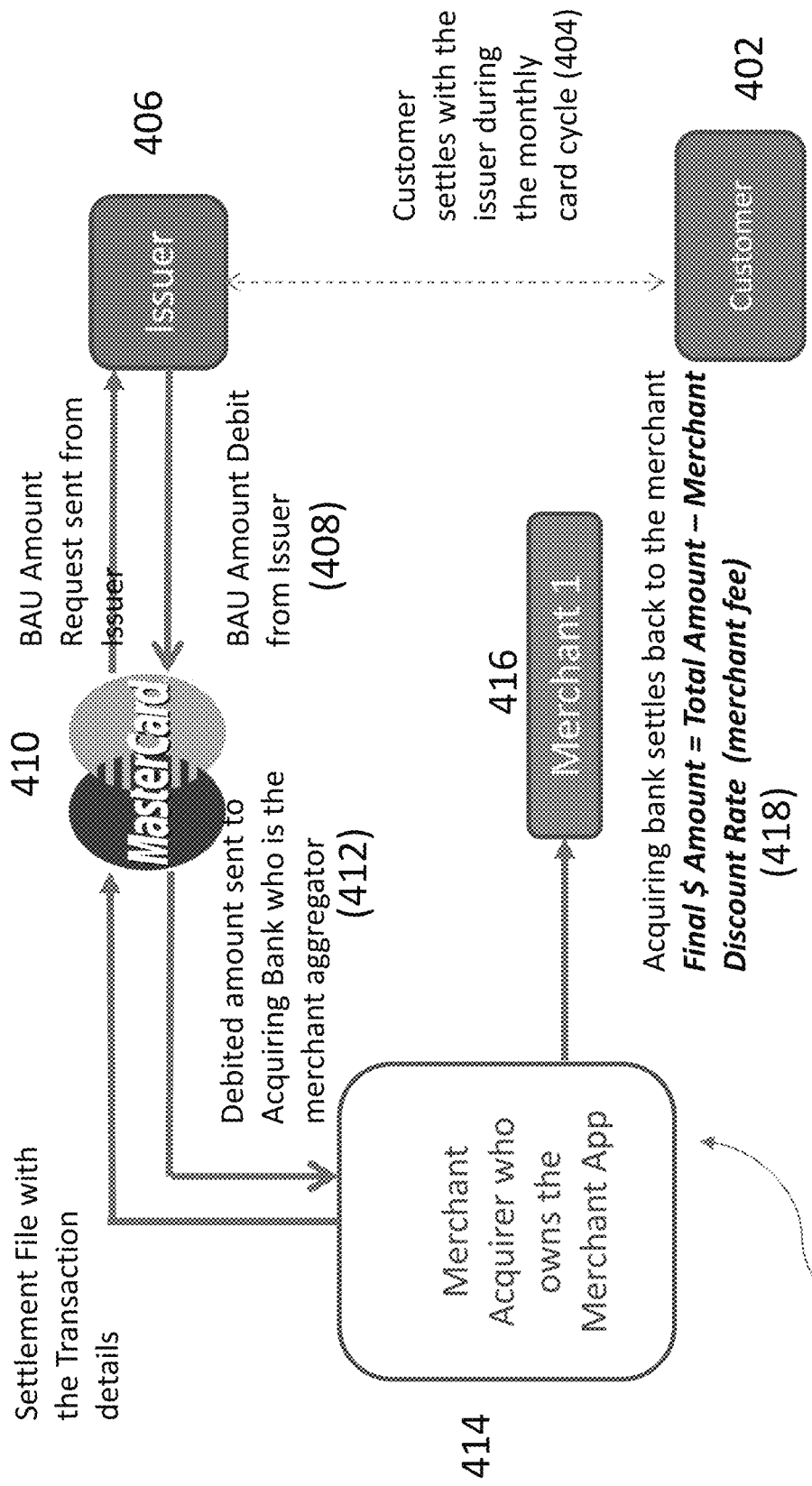
FIG. 4 is a schematic overview of a method for effecting settlement of an electronic transaction in accordance with present teachings.

FIG. 4 shows the settlement model 400 by which transactions made using the method of FIG. 1 are settled. The consumer 402 holds an account associated with the payment vehicle, the account containing funds that can be debited to afford purchase of the articles. Funds are debited (404) for the purchase by the issuer 406.

The issuer 406 then forwards the debited funds (408), minus any applicable fee or commission, to the payment scheme 410. Similarly, the payment scheme 410 forwards the remaining funds (412) to the merchant acquirer 414, minus any applicable fee or commission.

In the usual course of settlement, the merchant acquirer 414 would pass the entirety of the remaining funds, again minus any applicable fee or commission, to the payment gateway. The payment gateway takes its fee or commission and then distributes funds to the merchant 416.

In the example shown in FIG. 4, the merchant acquirer 414 also owns the merchant aggregator platform and the acquirer bank account for the merchant 416. This enables the merchant acquirer 414 to deposit funds (418) directly into the acquirer bank account of the merchant 416 via internal transfer (i.e. within the organisation).

In addition, the merchant acquirer 414 can send purchase details and payment vehicle credentials to the payment scheme as discussed in relation to FIG. 2, while also settling the purchase with the merchant 416.

Figure 5:
FIG. 5 is a diagrammatical overview of the interrelationship between various parties for performing the method of FIG. 4.

This configuration enables significant flexibility particularly since the merchant acquirer 414 has direct access to purchase or transaction details through ownership of the merchant aggregator platform. A method 500 demonstrating the flexibility of settlement is broadly outlined in FIG. 5, and comprises effecting settlement of a purchase by:

providing a merchant aggregator platform hosted by a merchant acquirer (step 502);

sending purchase details of a purchase made by a consumer of one or more articles offered for sale by a merchant through the platform, from the platform to the merchant acquirer (504);

forwarding the purchase details from the merchant acquirer to a payment scheme or issuer for debiting settlement funds from an account of the consumer (506); and forwarding, independently of the purchase details being sent to the issuer, settlement funds to the merchant to settle the purchase (508).

Step 504, in effect, means that the merchant need no longer send invoices to the merchant acquirer 414 since the merchant acquirer 414 collects purchase details through the merchant aggregator platform. Thus the merchant acquirer 414 can send settlement details (i.e. purchase details and payment vehicle credentials) to the issuer for settlement, and separately settle with the merchant 416. In some embodiments, this will enable settlement with the merchant 416 to bypass payment gateways. While bypassing the payment gateway can be achieved without payment of a fee to the payment gateway, the merchant acquirer may deduct a fee on behalf of the payment gateway from the settlement funds and transfer the remaining settlement funds into the acquirer bank account of the merchant. The fee deducted on behalf of the payment gateway may then be forwarded to the payment gateway separately.

Figure 6:
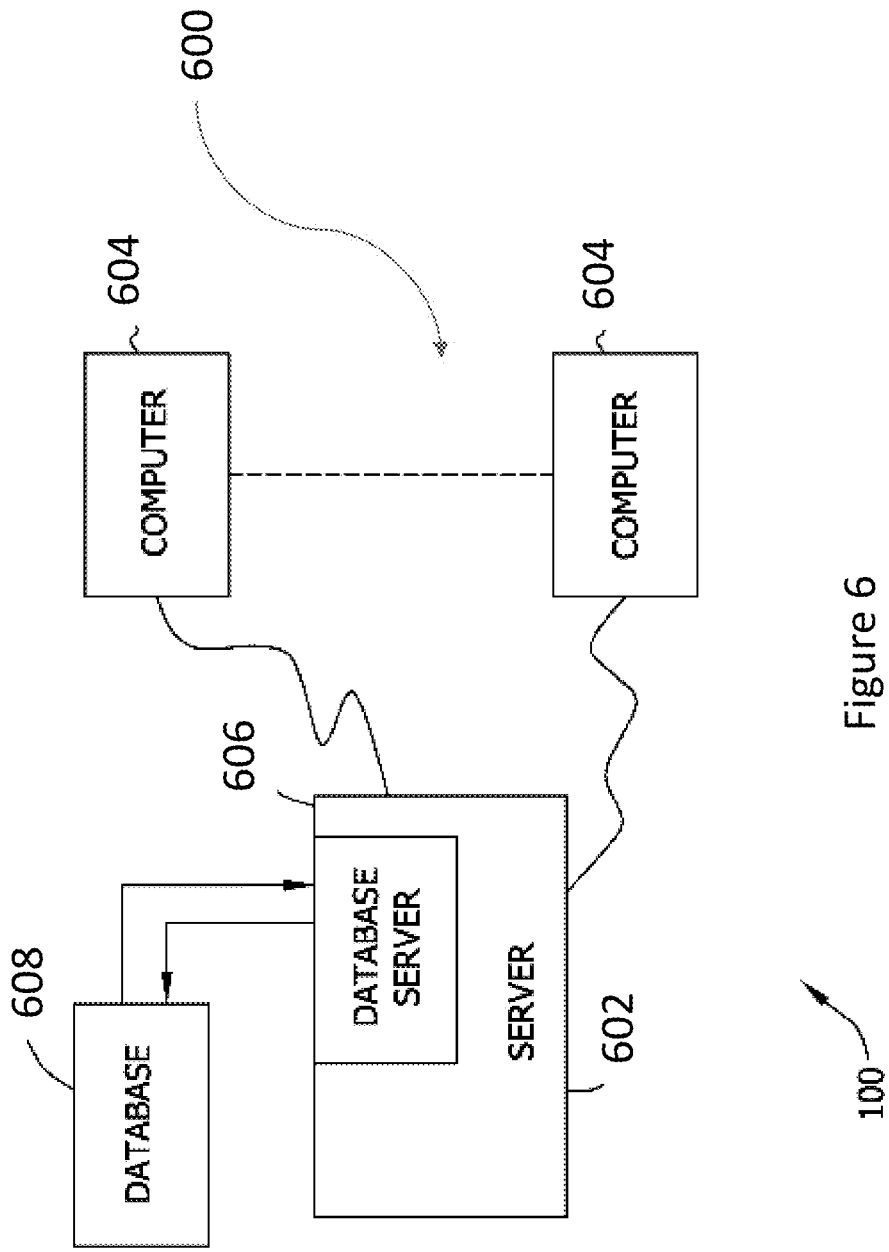
FIG. 6 is an expanded block diagram of an exemplary embodiment of a server architecture of a computer system for effecting an electronic transaction.

FIG. 6 is a simplified block diagram of an exemplary network-based system 600 used for effecting an electronic transaction. In the example embodiment, system 600 includes a server system 602, and at least one computer system. The computer system presently comprises multiple remote systems 604, one system 604 being for each of the consumer device (although this may be a smartphone), payment gateway, payment scheme and issuer. The remote systems 604 are connected to server system 602. In one embodiment, remote systems 604 include internet connectivity such that server system 602 is accessible to remote systems 604 using the Internet. Remote systems 604 may be interconnected to the Internet through a variety of interfaces including a network, such as a local area network (LAN) or a wide area network (WAN), dial-in-connections, cable modems and special high-speed ISDN lines. Remote systems 604 could be any device capable of interconnecting to the Internet including a personal computer (PC), a web-based phone, personal digital assistant (PDA), or other web-based connectable equipment.

A database server 606 is connected to memory device, presently 608, which contains information the catalogues, article descriptions, promotional material, advertising material and so forth, by which the merchant aggregator is populated with articles for purchase. In one embodiment, centralized database 608 is stored on server system 602 and can be accessed by potential users (e.g. merchants and consumers) at one of the remote systems 604 by logging onto server system 602 through one of remote systems 604. In an alternative embodiment, database 608 is stored remotely from server system 602 and may be non-centralized. Database 608 may store electronic files. Electronic files may include electronic documents, web pages, article descriptions, catalogues, advertisements, promotional material, image files and/or electronic data of any format suitable for storage in database 608 and delivery using system 600.

More specifically, database 608 may store any data and computer programs necessary to achieve the methods of FIGS. 1 and 4.

The system 600 may actually be involved in collection of that data. For example, the system 600 may be involved in the provision of financial services over a network and thereby collect data relating to merchants, account holders or customers, developers, issuers, acquirers, purchases made, and services provided by system 600 and systems and third parties with which the system 600 interacts. For example, server system 602 could be in communication with an interchange network.

Similarly, database 608 may also store account data including at least one of a cardholder name, a cardholder address, an account number, and other account identifier. Database 608 may also store merchant data including a merchant identifier that identifies each merchant registered to use the network and/or merchant aggregator platform, and instructions for settling transactions including merchant bank account information. Database 608 may also store purchase data associated with Claims being purchased by a cardholder from a merchant, and authorization request data.

The database 608 may also be a non-transitory computer readable medium storing or embodying a computer program for effecting an electronic transaction. The program may include at least one code segment executable by a computer to instruct the computer to perform a method for effecting an electronic transaction as described herein, for example with reference to FIG. 1 or 4.

Figure 7:
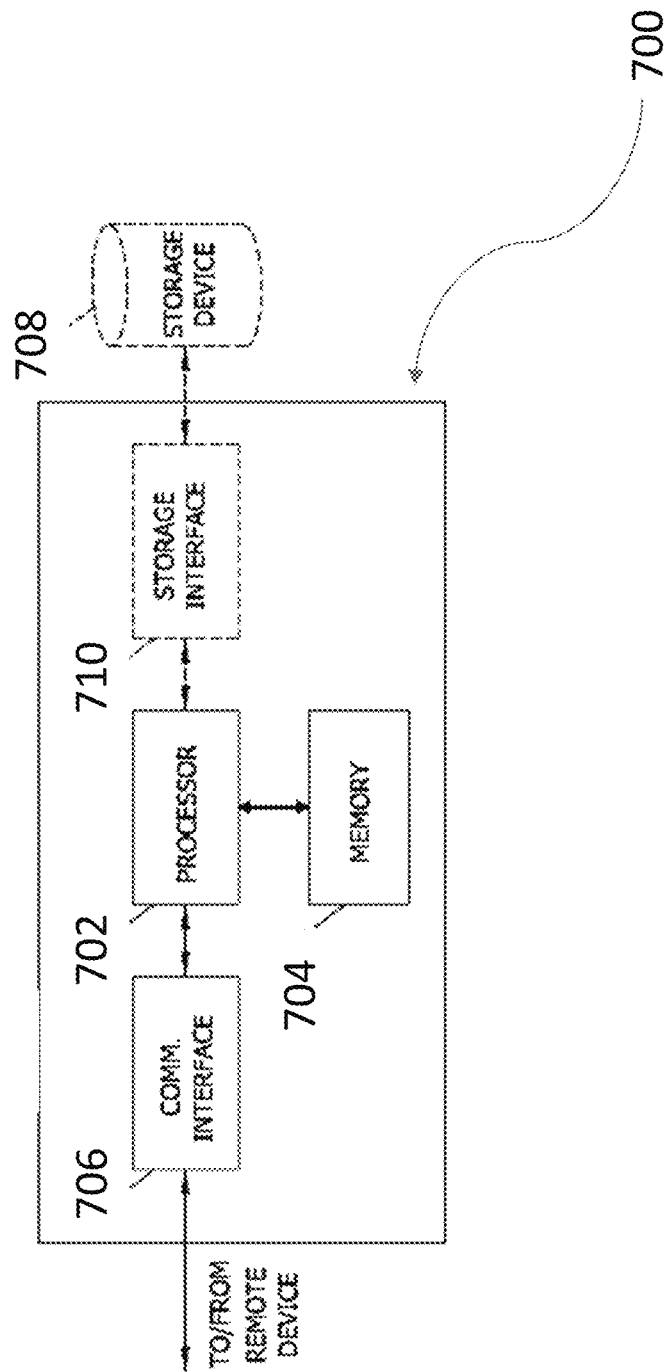
FIG. 7 illustrates an exemplary configuration of a server system shown in FIG. 6.

FIG. 7 illustrates an exemplary configuration of a computing device 700, similar to server system 600 (shown in FIG. 6). Computing device 700 may include, but is not limited to, database server, application server, web server, fax server, directory server, and mail server.

Server computing device 700 also includes a processor 702 for executing instructions. Instructions may be stored, for example, in a memory area 704 or other computer-readable media. Processor 702 may include one or more processing units (e.g., in a multi-core configuration).

Processor 702 may be operatively coupled to a communication interface 707 such that server computing device 700 is capable of communicating with a remote device such as user computing device 704 or another server computing device 700. For example, communication interface 707 may receive requests from a client system 704 via the Internet.

Processor 702 may also be operatively coupled to storage device 708. Storage device 708 is any computer-operated hardware suitable for storing and/or retrieving data. In some embodiments, storage device 708 is integrated in server computing device 700. For example, server computing device 708 may include one or more hard disk drives as storage device 708. In other embodiments, storage device 708 is external to server computing device 700 and may be accessed by a plurality of server computing devices 700. For example, storage device 708 may include multiple storage units such as hard disks or solid state disks in a redundant array of inexpensive disks (RAID) configuration. Storage device 708 may include a storage area network (SAN) and/or a network attached storage (NAS) system.

In some embodiments, processor 700 is operatively coupled to storage device 708 via a storage interface 710. Storage interface 710 is any component capable of providing processor 702 with access to storage device 708. Storage interface 710 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 702 with access to storage device 708.

In operation, the processor 702, coupled to a memory device (including memory device 704 and storage device 708), is configured to receive through a merchant aggregator platform, a selection of one or more articles from a plurality of articles offered for purchase by a plurality of merchants on the merchant aggregator platform. The platform in this instance is hosted by a merchant acquirer. The processor is configured to thereafter pass payment vehicle credentials of a payment vehicle to a payment gateway. Using the payment vehicle credentials, the processor is configured to create a vehicle representative (VR—which may be a token created by a tokenising process) at the payment gateway and associate the VR with one or more credentials of the payment vehicle, and then send the VR to the merchant aggregator platform. The processor hosting the merchant aggregator platform is configured to receive a purchase request and forward purchase details with the VR to the payment gateway. The processor at the payment gateway is configured to identify the payment vehicle credentials and associate them with the purchase details based on the VR. Thus the payment vehicle credentials and purchase details are paired and to the merchant acquirer for on-going processing of the transaction.

The computer system 700 may be instructed to effect an electronic transaction by a computer program embodied on a non-transitory computer readable medium, such as memory device 704 or storage device 708. The program stored on the device 704 708 would include at least one code segment, and most likely many thousands of code segments, executable by a computer to instruct the computer to perform the requested operations.

In operation in relation to effecting settlement of a purchase, the processor 702, coupled to a memory device (including memory device 704 and storage device 708), is configured to provide a merchant aggregator platform hosted by a merchant acquirer. The processor is also configured to send purchase details of a purchase made by a consumer of one or more articles offered for sale by a merchant through the platform, from the platform to the merchant acquirer. This 'sending' of purchase details may be directly from the merchant aggregator platform to the merchant acquirer, or may pass through the payment gateway between the merchant aggregator platform and the merchant acquirer. The processor then forwards the purchase details from the merchant acquirer to a payment scheme or issuer for debiting settlement funds from an account of the consumer. Thereafter, the processor is configured to forward, independently of the purchase details being sent to the issuer, settlement funds to the merchant to settle the purchase.

Similarly, the programs executed to cause a computer system to perform the methods described herein may be stored remotely. To this end, the computer system may constitute a client computer system of a network-based system for effecting an electronic transaction and/or for settling a purchase.

Many modifications and variations of the present teachings will be apparent to the skilled person in light of the present disclosure. All such modifications and variations are intended to fall within the scope of the present disclosure. Moreover, to the extent possible, features form one of the embodiments described herein may be used in one or more other embodiments to enhance or replace a feature of the one or more other embodiments. All such usage, substitution and replacement is intended to fall within the scope of the present disclosure.

The invention claimed is:

1. A method of effecting an electronic transaction, comprising:
   a. receiving, through a merchant aggregator platform, a selection of one or more articles from a plurality of articles offered for purchase by a plurality of merchants on the merchant aggregator platform, wherein the platform is hosted by a merchant acquirer;
   b. passing payment vehicle credentials of a payment vehicle to a payment gateway;
   c. creating a vehicle representative (VR) at the payment gateway and associating the VR with one or more credentials of the payment vehicle, the VR being useable by the merchant aggregator platform, in place of the one or more credentials, wherein the VR is other than an encryption or a cipher;
   d. providing the VR to the merchant aggregator platform;
   e. receiving, through the merchant aggregator platform, a purchase request confirming that the one or more articles have been purchased;
   f. sending purchase details of the purchase request with the VR to the payment gateway; and
   g. identifying the payment vehicle credentials and associating them with the purchase details, at the payment gateway, based on the VR and passing the payment vehicle credentials and purchase details to the merchant acquirer for on-going processing of the transaction.

2. A method according to claim 1, wherein the merchant aggregator platform is a mobile app and the step of receiving the selection of one or more articles comprises receiving a selection of one or more articles through the mobile app.

3. A method according to claim 1, wherein the merchant aggregator platform is a website and the step of receiving the selection of one or more articles comprises receiving a selection of one or more articles for purchase through the website.

4. A method according to claim 1, wherein the payment vehicle comprises a credit or debit card.

5. A method according to claim 4, wherein passing payment vehicle credentials comprises passing, to the gateway, at least one of a card number, card balance, card expiry date and a unique device identifier for identifying a device hosting the merchant aggregator platform.

6. A method according to claim 5, wherein passing payment vehicle credentials comprises passing the unique device identifier, wherein the unique device identifier comprises an international mobile station equipment identity for the device.

7. A method according to claim 1, wherein creating a VR comprises creating a unique character string associated with one or more of the payment vehicle credentials.

8. A method according to claim 7, wherein creating a VR comprises creating a random character string.

9. A method according to claim 1, wherein the VR comprises the last four digits of a credit card or debit card number.

10. A method according to claim 1, wherein associating the payment vehicle credentials with the purchase details comprises mapping the VR to one or more stored VRs stored by the payment gateway, to identify the one or more credentials associated with the VR.

11. A method according to claim 1, wherein the merchant acquirer holds a settlement account, into which settlement funds are deposited for settling the purchase, and an acquirer bank account for each of one or more of the merchants, the method further comprising moving funds, from a transaction performed on the merchant aggregator platform, internally to the merchant acquirer from the settlement account into the acquirer bank account of at least one of the merchants.

12. A method according to claim 11, the method further comprising establishing an access account through which a merchant can access the merchant aggregator platform, and receiving, from the merchant, details of at least one article to offer for purchase on the merchant aggregator platform.

13. A method according to claim 12, wherein establishing an access account comprises establishing an acquirer bank account using merchant details of the merchant, and automatically establishing an access account linked to the acquirer bank account such settlement funds for purchases made through the merchant aggregator platform are automatically transferred from the settlement account into the acquirer bank account upon receipt of those funds by the merchant acquirer.

14. A method according to claim 11, further comprising depositing funds into the acquirer bank account upon receipt of those funds into the settlement account of the acquirer.

15. A method according to claim 14, wherein the depositing step bypasses the payment gateway.

16. A computer system for effecting an electronic transaction, the computer system comprising:
   a memory device for storing data;
   a display; and
   at least one processor coupled to the memory device and being configured to:
   receive, through a merchant aggregator platform, a selection of one or more articles from a plurality of articles offered for purchase by a plurality of merchants on the merchant aggregator platform, wherein the platform is hosted by a merchant acquirer;

pass payment vehicle credentials of a payment vehicle to a payment gateway;

create a vehicle representative (VR) at the payment gateway and associate the VR with one or more credentials of the payment vehicle, the VR being useable by the merchant aggregator platform, in place of the one or more credentials, wherein the VR is other than an encryption or a cipher;

provide the VR to the merchant aggregator platform;

receive, through the merchant aggregator platform, a purchase request confirming that the one or more articles have been purchased;

send purchase details of the purchase request with the VR to the payment gateway; and identify the payment vehicle credentials and associating them with the purchase details, at the payment gateway, based on the VR and passing the payment vehicle credentials and purchase details to the merchant acquirer for on-going processing of the transaction.

\* \* \* \* \*